ись

United States Patent
Hardy et al.

(10) Patent No.: US 11,175,999 B2
(45) Date of Patent: Nov. 16, 2021

(54) MANAGEMENT OF BACKUP VOLUME EXTENTS VIA A TIERED STORAGE MECHANISM

(71) Applicant: International Business Machines Corporation, Armonk, NY (US)

(72) Inventors: Clint A. Hardy, Tucson, AZ (US); Nicolas M. Clayton, Warrington (GB); Yang Liu, Pudong (CN); Gail Spear, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 16/123,674

(22) Filed: Sep. 6, 2018

(65) Prior Publication Data

US 2020/0081800 A1    Mar. 12, 2020

(51) Int. Cl.
G06F 11/14    (2006.01)
G06F 3/06     (2006.01)

(52) U.S. Cl.
CPC ......... *G06F 11/1464* (2013.01); *G06F 3/067* (2013.01); *G06F 3/0619* (2013.01); *G06F 3/0644* (2013.01); *G06F 3/0649* (2013.01); *G06F 3/0656* (2013.01); *G06F 3/0665* (2013.01)

(58) Field of Classification Search
USPC ....................................................... 711/162
See application file for complete search history.

(56) References Cited

U.S. PATENT DOCUMENTS

| | | | |
|---|---|---|---|
| 6,567,888 B2 | 5/2003 | Kedem | |
| 7,543,110 B2 | 6/2009 | Stolowitz | |
| 7,827,366 B1* | 11/2010 | Nadathur | G06F 11/1464 711/162 |
| 7,856,022 B1* | 12/2010 | Wigmore | G06F 3/0647 370/395.71 |
| 8,010,495 B1 | 8/2011 | Kuznetzov et al. | |
| 8,028,110 B1* | 9/2011 | Wigmore | G06F 3/067 710/74 |
| 8,055,938 B1 | 11/2011 | Chatterjee et al. | |
| 8,533,397 B2 | 9/2013 | Bar-El et al. | |
| 8,549,225 B2 | 10/2013 | Blinick et al. | |
| 8,713,272 B2 | 4/2014 | Agombar et al. | |
| 8,850,106 B2 | 9/2014 | Benhase et al. | |
| 8,938,428 B1 | 1/2015 | Ozekinci et al. | |

(Continued)

OTHER PUBLICATIONS

U.S. Appl. No. 16/123,412, filed Sep. 6, 2018.

(Continued)

*Primary Examiner* — Michael Krofcheck
*Assistant Examiner* — John Francis Wojton
(74) *Attorney, Agent, or Firm* — Konrad Raynes Davda & Victor LLP; Rabindranath Dutta

(57) ABSTRACT

A determination is made that a point-in-time copy of a consistency group of a production volume has to be stored in a backup storage that is configured to store a plurality of point-in-time copies generated at a plurality of time instants. An extent of a thin provisioned volume of a highest storage tier of a tiered storage is allocated to store the point-in-time copy of the consistency group. A process is initiated for storing the point-in-time copy of the consistency group to the extent of the highest storage tier of the tiered storage.

20 Claims, 8 Drawing Sheets

(56) References Cited

U.S. PATENT DOCUMENTS

| | | | |
|---|---|---|---|
| 9,026,765 B1* | 5/2015 | Marshak | G06F 12/0866 |
| | | | 711/170 |
| 9,471,499 B2 | 10/2016 | Brown et al. | |
| 9,558,072 B1 | 1/2017 | Mam | |
| 9,600,375 B2 | 3/2017 | Dain et al. | |
| 9,600,377 B1 | 3/2017 | Cohen et al. | |
| 9,626,115 B2 | 4/2017 | Dain et al. | |
| 9,658,798 B2 | 5/2017 | Ash et al. | |
| 9,733,862 B1 | 8/2017 | Klemm et al. | |
| 9,817,724 B2 | 11/2017 | Dain et al. | |
| 9,852,198 B1 | 12/2017 | Kuznetzov et al. | |
| 9,857,962 B2 | 1/2018 | Yui et al. | |
| 9,857,996 B2 | 1/2018 | Wilkinson | |
| 9,898,224 B1* | 2/2018 | Marshak | G06F 3/0647 |
| 9,927,980 B1 | 3/2018 | LeCrone et al. | |
| 10,013,361 B2 | 7/2018 | Mannenbach et al. | |
| 10,637,793 B1* | 4/2020 | Scott | H04L 41/0893 |
| 2005/0071372 A1 | 3/2005 | Bartfai et al. | |
| 2005/0171979 A1 | 8/2005 | Stager et al. | |
| 2006/0106891 A1 | 5/2006 | Mahar et al. | |
| 2008/0155216 A1 | 6/2008 | Shoham | |
| 2008/0222377 A1 | 9/2008 | Wightwick et al. | |
| 2014/0108756 A1 | 4/2014 | Brown et al. | |
| 2014/0344526 A1 | 11/2014 | Brown et al. | |
| 2015/0081628 A1 | 3/2015 | Brown et al. | |
| 2015/0106568 A1* | 4/2015 | Feldman | G06F 12/0811 |
| | | | 711/122 |
| 2015/0261678 A1 | 9/2015 | Gupta et al. | |
| 2015/0286424 A1 | 10/2015 | Dain et al. | |
| 2015/0286432 A1 | 10/2015 | Dain et al. | |
| 2015/0286542 A1 | 10/2015 | Dain et al. | |
| 2016/0232102 A1 | 8/2016 | Ash et al. | |
| 2016/0253121 A1 | 9/2016 | Guo et al. | |
| 2016/0259574 A1 | 9/2016 | Carpenter et al. | |
| 2016/0291890 A1 | 10/2016 | Jennas et al. | |
| 2017/0153950 A1 | 6/2017 | Iwasaki et al. | |
| 2017/0161153 A1 | 6/2017 | Dain et al. | |
| 2017/0177443 A1 | 6/2017 | Figueroa et al. | |
| 2018/0136874 A1 | 5/2018 | Karve et al. | |
| 2018/0150229 A1 | 5/2018 | Brown et al. | |
| 2020/0081800 A1* | 3/2020 | Hardy | G06F 3/0644 |

OTHER PUBLICATIONS

U.S. Appl. No. 16/123,457, filed Sep. 6, 2018.
U.S. Appl. No. 16/123,618, filed Sep. 6, 2018.
U.S. Appl. No. 16/123,771, filed Sep. 6, 2018.
U.S. Appl. No. 16/123,445, filed Sep. 6, 2018.
U.S. Appl. No. 16/123,660, filed Sep. 6, 2018.
U.S. Appl. No. 16/123,486, filed Sep. 6, 2018.
U.S. Appl. No. 15/611,569 filed Jun. 1, 2017.
U.S. Appl. No. 15/663,727 filed Jul. 29, 2017.
U.S. Appl. No. 15/828,288 filed Nov. 30, 2017.
U.S. Appl. No. 15/828,302 filed Nov. 30, 2017.
Azagury et al.; "Point-In-Time Copy: Yesterday, Today And Tomorrow", IBM Storage Systems Group, 2002, pp. 259-270.
Anonymous, "Data Aware Optimized Backups—Object & System Level", dated Jun. 2, 2016, An IP.com Prior Art Database Technical Disclosure, IPCOM000246384D, Total 7 pages.
IBM, "Data Protection Manager for Exchange 2010 and the IBM® Storwize® V7000 with SAN Based Replica Creation and Recovery" Installation and Configuration Guide, dated Jul. 2011, Version: 2.7.4, Total 44 pages.
Dufrasne et al., "IBM DS8880 Architecture and Implementation (Release 8.3)", IBM, Nov. 2017, Total 510 pp.
EMC et al.; "Introduction To XtremIO Virtual Copies", White Paper, Part No. H13035-01 (Rev. 02), Mar. 2016, pp. 1-39.
Brooks et al., "IBM Tivoli Storage Manager for Advanced Copy Services" dated Dec. 2006, International Technical Support Organization, Total 318 pages.
Lim, S et al., "Efficient Journaling Writeback Schemes for Reliable and High-Performance Storage Systems", Pers Ubiquit Comput, 17, 2013, 14 pp.
Mell, P. and T. Grange, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.
Mell, P. and T. Grange, "The NIST Definition of Cloud Computing (Draft)", Sep. 2011, Computer Security Division Information Technology Laboratory National Institute of Standards and Technology, Total 7 pp.
Anonymous, "Method for Enhanced Application Performance During FlashCopy Restore in Multi-tier Storage Environment", dated Nov. 28, 2017, An IP.com Prior Art Database Technical Disclosure, IPCOM000251706D, Total 8 pages.
Taylor, Chris; "Effective Backups: Selecting The Right Backup Mechanism To Match The Business Requirement", Session 16273, pp. 1-62, 2014.
Anonymous, "Tweak Modification to Improve Reliability and Durability in an Encrypted Flash Based Back-Up System" dated Jan. 25, 2017, An IP.com Prior Art Database Technical Disclosure, IPCOM000248984D, Total 4 pages.
Wu, et al., "LDM: Log Disk Mirroring with Improved Performance and Reliability for SSD-Based Disk Arrays", ACM Transactions on Storage, vol. 12, No. 4, Article 22, May 2016, 21 pp.
Yang et al.; "TRAP-Array: A Disk Array Architecture Providing Timely Recovery to Any Point-in-time," 33rd International Symposium on Computer Architecture (ISCA'06), Boston, MA, 2006, pp. 289-301.
Wikipedia, "Binary Search Algorithm", [online], edited on Aug. 14, 2018. Retrieved from the Internet at: <URL https://en.wikipedia.org/w/index.php?title=Binary_search_algorithm&oldid=854879077>, Total 8 pp.
U.S. Appl. No. 16/123,635, filed Sep. 6, 2018.

* cited by examiner

MANAGEMENT OF BACKUP VOLUME EXTENTS VIA A TIERED STORAGE MECHANISM

BACKGROUND

1. Field

Embodiments relate to the management of backup volume extents via a tiered storage mechanism.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

One or more storage controllers may be used to perform data mirroring by copying data from production volumes to backup volumes for business continuity and disaster recovery. In the event of data loss in production volumes, the backup volumes may be used to recover the data.

Point-in-time copy allows creation of instantaneous, point-in-time snapshot copies of entire logical volumes or data sets. A point-in-time copy may involve physically copying all the data from source volumes (e.g., production volumes) to target volumes (e.g. backup volumes) so that the target volumes have a copy of the data as of a point in time. A point-in-time copy can also be made by logically making a copy of the data and then only copying data over when necessary.

When an application has one write that is dependent on the completion of another write, the application is said to have dependent writes. Using dependent writes, applications may manage the consistency of their data, so that a consistent state of the application data on storage devices is maintained, in the event of a failure in the host or the storage controller.

To maintain the consistency of data across multiple storage volumes, certain storage controllers support the concept of a consistency group. Storage volumes in a copy relationship that are configured into a consistency group are maintained to ensure that a group of dependent updates made to production storage volumes are made together as a unit on backup storage volumes to maintain data consistency.

Certain types of data mirroring may provide data replication via one or more storage controllers between a production volume and a backup volume. Such mirroring may replicate the data of the production volume in the backup volume while forming consistency groups at a regular intervals to allow a clean recovery of data. Once consistency groups are formed, a point-in-time copy operation is performed to copy from a production volume to a backup volume. A point-in-time copy is a fully usable copy of a defined collection of data that contains an image of the data as it appeared at a single point-in-time. The copy is considered to have logically occurred at that point-in-time. Further details of a storage controller that performs storage management tasks including mirroring, point-in-time copies, and consistency group formations may be found in the publication "IBM DS8880 Architecture and Implementation (Release 8.3)," published November 2017, by International Business Machines Corporation.

Tiered storage is the assignment of data to various types of storage media to reduce total storage cost. Storage tiers may be determined by performance and cost of the media on which data is stored. For example, mission-critical data may be stored on expensive, high-quality media and other data may be stored on inexpensive, low-quality media.

A thin provisioned storage volume is a type of storage volume in which physical storage space is allocated on demand. That is, the total virtual space allocated to a thin provisioned volume is not fully backed by physical storage space until an application writes to the thin provisioned volume, at which time space is allocated to hold the write data.

SUMMARY OF THE PREFERRED EMBODIMENTS

Provided are a method, system, and computer program product in which a determination is made that a point-in-time copy of a consistency group of a production volume has to be stored in a backup storage that is configured to store a plurality of point-in-time copies generated at a plurality of time instants. An extent of a thin provisioned volume of a highest storage tier of a tiered storage is allocated to store the point-in-time copy of the consistency group. A process is initiated for storing the point-in-time copy of the consistency group to the extent of the highest storage tier of the tiered storage.

In certain embodiments, in response to determining that the extent of the highest storage tier of the tiered storage is full, data in the extent of the highest storage tier of the tiered storage is demoted to a storage tier that is of a lower tier than the highest storage tier.

In further embodiments, the highest storage tier is comprised of storage devices that are faster than storage devices of the lower tier, wherein storage devices of the highest storage tier have lower storage capacity than storage devices of the lower tier.

In additional embodiments, reads from the backup storage for data recovery are relatively infrequent in comparison to writes of point-in-time copies of consistency groups to the backup storage.

In further embodiments, the writes of point-in-time copies of consistency groups are initially performed to the highest storage tier of the tiered storage and then written data is demoted opportunistically from the highest storage tier to a storage tier that is of a lower tier than the highest storage tier.

In certain embodiments, a plurality of point-in-time copies are maintained in a circular buffer, wherein in response to deletion of an older point-in-time copy, extents are released and then new extents are allocated for writing.

In additional embodiments, one or more point-in-time copies are deleted based on retention policies indicated for the one or more point-in-time copies.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

When copying data from a production volume to a backup volume in a storage controller, in certain types of copy mechanisms referred to as a "safeguarded copy function", tracks are copied into the backup volume in the order requested by a destage and "copy source to target" (CST) process, i.e., tracks are copied sequentially. In certain embodiments, the backup volume is a thin provisioned volume that is not host accessible and is used to contain a large numbers undo logs to allow construction of backup copies of a safeguarded production volume at various points in time.

The access pattern of the backup volume may be quite different from the access pattern of normal host accessible volumes and in many ways may be more predictable. For example, necessity for recovery from the backup volume is relatively infrequent whereas writes are performed relatively frequently to the backup volume. Since writes to thin provisioned backup volumes may require release of extents and then allocation of extents before writing of data, the writes may be relatively time consuming. To increase the processing speed at which writes can be performed on the backup volume, in certain embodiments a tiered storage may be maintained for the backup volume, and each newly allocated extent for storing data is taken from the highest performing storage tier. Once the allocated extent is full then the data is migrated to a lower tier. As a result, improvements are made to a storage controller by increasing the processing speed of the storage controller for performing safeguarded copy functions.

Exemplary Embodiments

Figure 1:
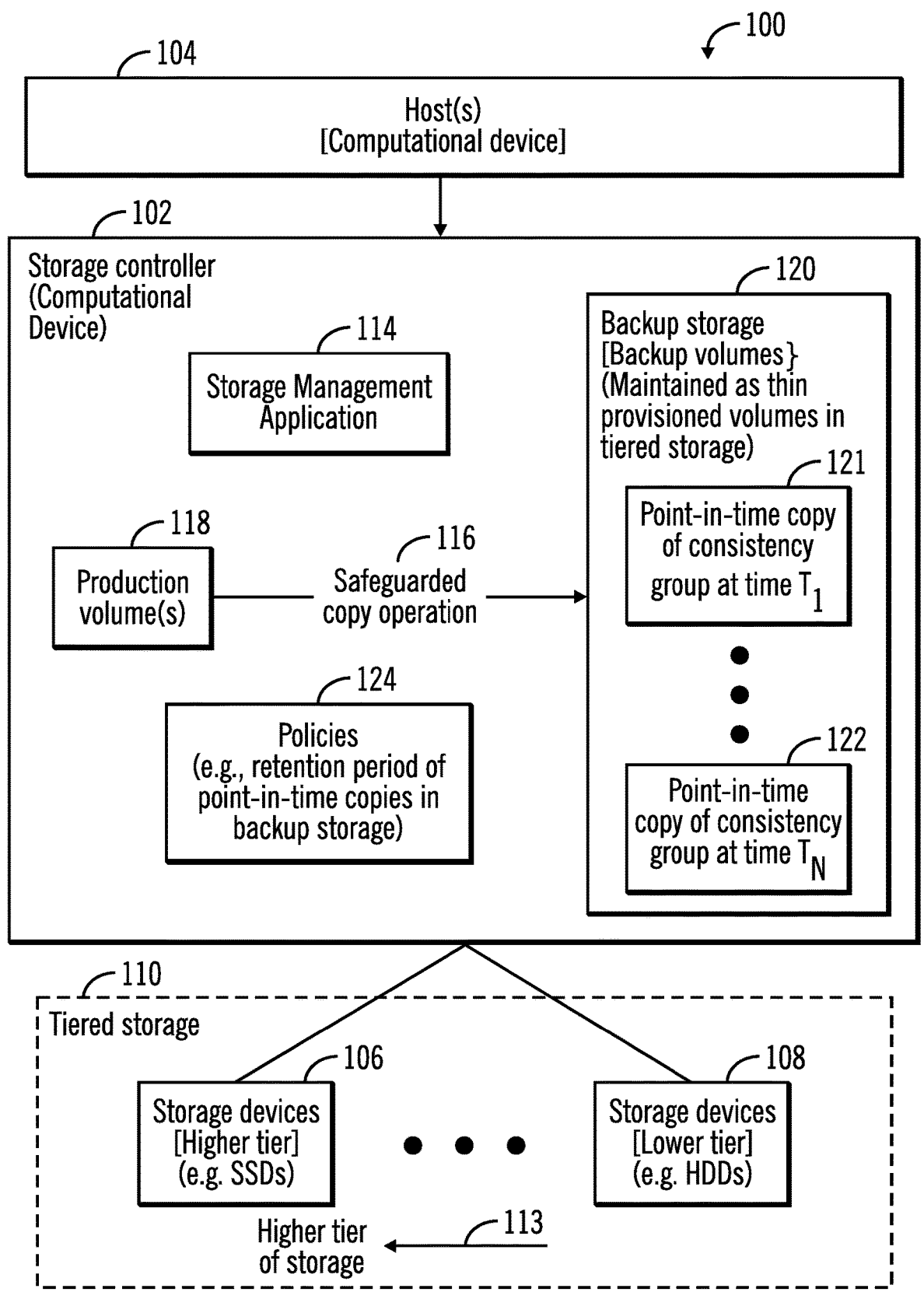
FIG. 1 illustrates a block diagram of a computing environment comprising a storage controller coupled to one or more hosts and one or more storage devices configured as tiered storage, in accordance with certain embodiments.

FIG. 1 illustrates a block diagram of a computing environment 100 comprising a storage controller 102 coupled to one or more hosts 104 and one or more storage devices 106, 108, in accordance with certain embodiments.

The storage controller 102 allows the one or more hosts 104 to perform input/output (I/O) operations with logical storage maintained by the storage controller 102. The physical storage corresponding to the logical storage may be found in one or more of the storage devices 106, 108 and/or a cache of the storage controller 102.

The storage controller 102 and the hosts 104 may comprise any suitable computational device including those presently known in the art, such as, a personal computer, a workstation, a server, a mainframe, a hand held computer, a palm top computer, a telephony device, a network appliance, a blade computer, a processing device, a controller, etc. In certain embodiments, the storage controller 102 may be comprised of a plurality of servers. The plurality of servers may provide redundancy because if one server undergoes a failure from which recovery is not possible, an alternate server may perform the functions of the server that failed. Each of the plurality of servers may be referred to as a processing complex and may include one or more processors and/or processor cores. While FIG. 1 shows a single storage controller 102, in alternative embodiments the operations performed by the storage controller 102 may be performed by a plurality of storage controllers.

The storage controller 102 and the one or more hosts 104 may be elements in any suitable network, such as, a storage area network, a wide area network, the Internet, an intranet. In certain embodiments, storage controller 102 and the one or more hosts 104 may be elements in a cloud computing environment.

The plurality of storage devices 106, 108 may be comprised of any storage devices known in the art, such as solid state drives (SSD), hard disk drives (HDD), etc. A plurality of the storage devices 106, 108 may be maintained as a tiered storage 110. In FIG. 1, the higher tiers of storage are shown towards the left and the lower tiers of storage towards the right as shown by the arrow 113 and the legend "higher tier of storage". In certain embodiments a higher storage tier may be comprised of a faster and more expensive storage media with lower storage capacity, and a lower storage tier may be comprised of slower and cheaper storage media with larger storage capacity. For example, in certain embodiments, a higher storage tier may be comprised of solid state drives (SSD) and a lower storage tier may be comprised of hard disk drives (HDD). In certain other embodiments, a highest storage tier may be comprised of single level cell (SLC) flash, an intermediate storage tier may be comprised of multi-level cell (MLC) flash, and a lowest storage tier may be comprised of HDDs.

A storage management application 114 may perform a safeguarded copy operation 116 to perform a sequential copy of tracks from one or more production volumes 118 to one or more backup volumes 120 (also referred to as backup storage) In certain embodiments, the storage management application 114 may be implemented in software, firmware, hardware, or any combination thereof.

In the safeguarded copy operations 116, a plurality of point-in-time copies of consistency groups at various points in time are made to the backup storage 120 from the production volume 118 for storing backups of data at a plurality of time instants. For example, FIG. 1 shows a plurality of point-in-time copies 121, 122 at a plurality of points in time. In the event of a need for data recovery at a particular instant of time, a suitable point-in-time copy is selected from the point-in-time copies 121, 122.

The storage management application 114 may delete point-in-time copies from the backup storage 120 based on certain policies 124. For example, in certain embodiments the policies 124 may indicate retention period of point-in-time copies in the backup storage 120.

The backup volumes of the backup storage 120 are logical volumes and the corresponding physical storage is on physical volumes maintained in the tiered storage 110 by the storage management application 114. The backup volumes are maintained as thin provisioned volumes where extents are allocated only when writing is needed.

In certain embodiments, the storage management application 114 ensures that during initial writes to the backup volumes, the written data is stored on the highest storage tier of the tiered storage 110 as it is time consuming to write on thin provisioned volumes. At an opportune time, data may be demoted to lower storage tiers of the tiered storage 110 because reads for data recovery from the backup volumes 120 is relatively infrequent.

Therefore, FIG. 1, illustrates certain embodiments in which the storage management applications 114 takes advantage of the unique access patterns of the backup storage 120 when safeguarded copy operations 116 are made to the backup storage 120 by storing write data on the highest storage tier and then opportunistically demoting the write data to lower storage tiers.

Figure 2:
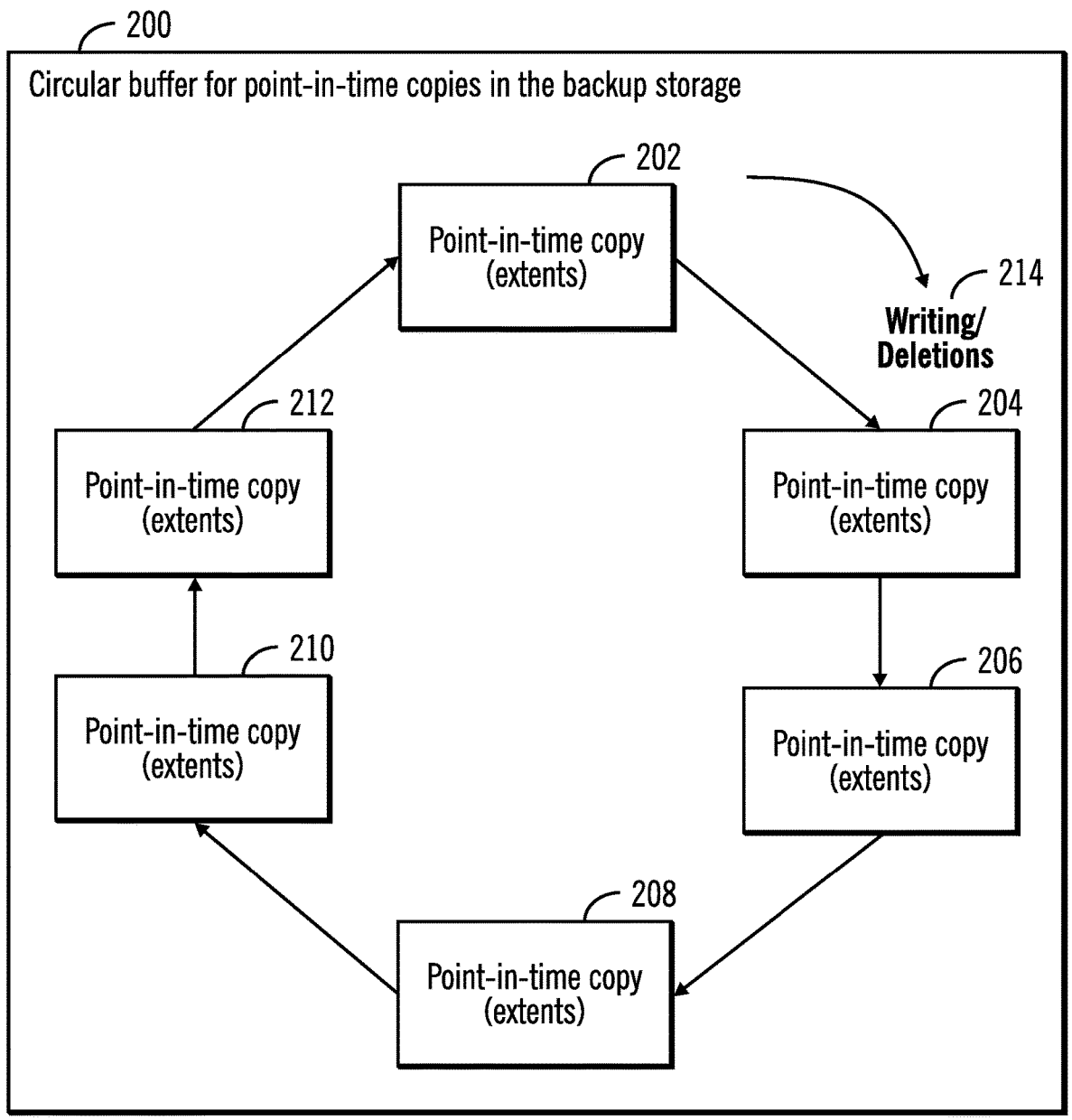
FIG. 2 illustrates a block diagram that shows a circular buffer for point-in-time copies maintained in a backup storage, in accordance with certain embodiments.

FIG. 2 illustrates a block diagram 200 that shows a circular buffer for point-in-time copies maintained in a backup storage 120, in accordance with certain embodiments.

In FIG. 2, the storage management application 112 performs safeguarded copy operations 216 by sequentially writing point-in-time copies to buffers 202, 204, 206, 208, 210, 212 and then again to buffer 202 as shown via the arc 214 with the legend "writing/deletions". Each buffer 202, 204, 206, 208, 210 is comprised of one or more extents of thin provisioned volumes. Point-in-time copies may of course be deleted based on the policies 124.

Figure 3:
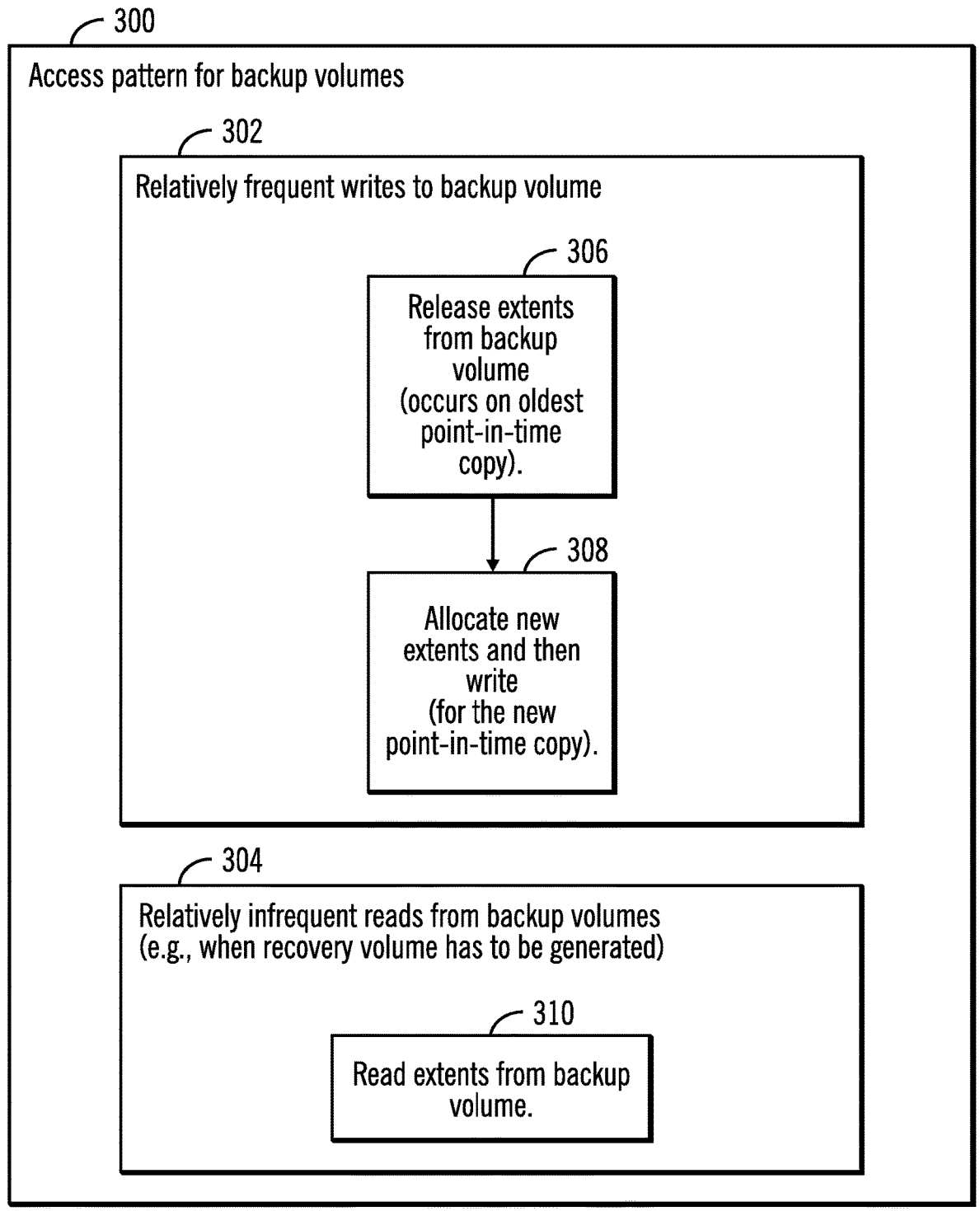
FIG. 3 illustrates a block diagram that shows access pattern for backup volumes, in accordance with certain embodiments.

FIG. 3 illustrates a block diagram 300 that shows access pattern for backup volumes, in accordance with certain embodiments.

Block 302 shows that relatively frequently writes are performed on backup volumes, whereas blocks 304 shows that relatively infrequent reads are performed on backup volumes. The reads are relatively infrequent because data loss is relatively infrequent and so recovery volumes to recover from data loss have to be generated relatively infrequently from the backup volumes.

For performing writes to thin provisioned backup volumes, one or more extents are released from a backup volume (as shown via reference numeral 306) and this releasing of extents may occur for the oldest point-in-time copy. From block 306 control proceeds to block 308 in which for the new point-in-time copy, new extents are allocated for writing and the data written to the new extents (as shown via reference numeral 308). It should be noted that the release and allocation of extents that are needed for thin provisioned volumes may be time consuming. For reading data, extents are read from the backup volumes (as shown via reference numeral 310).

Figure 4:
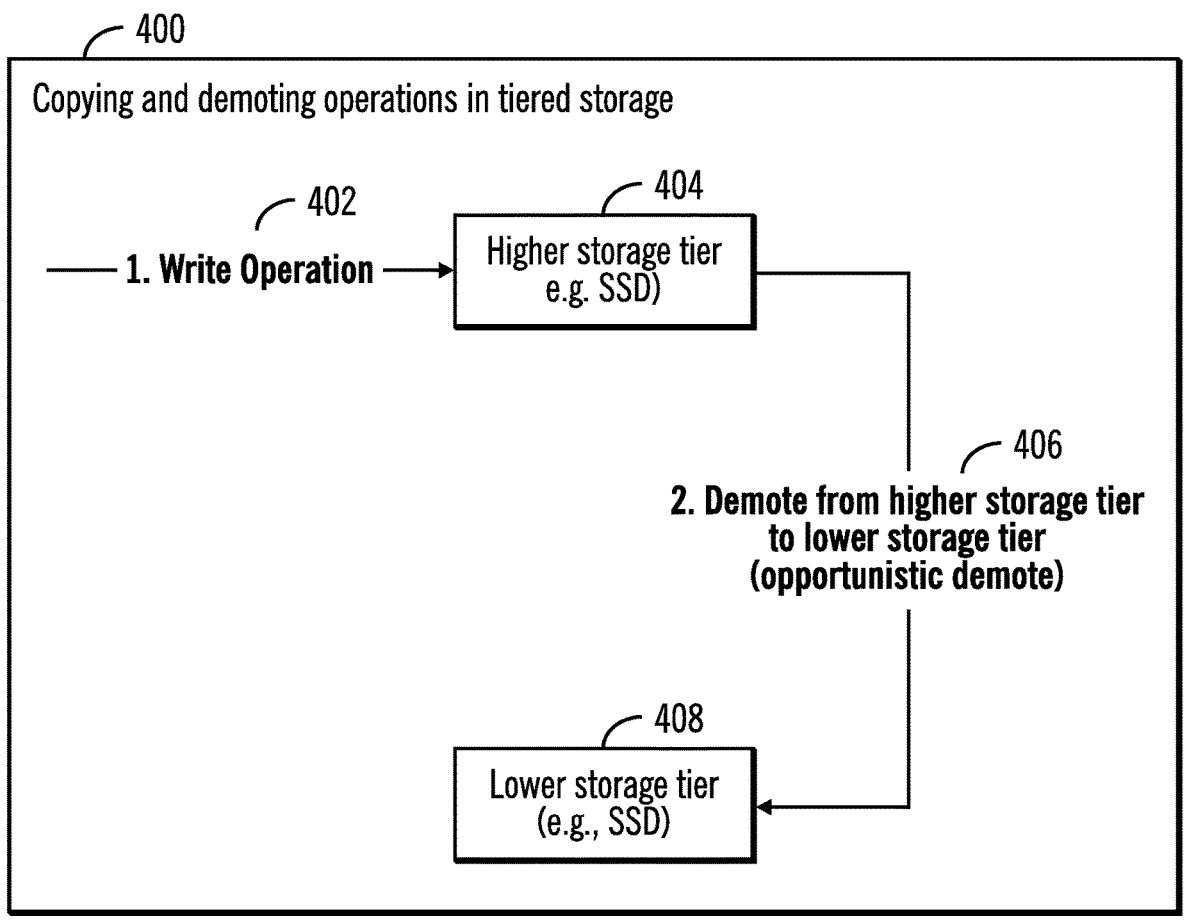
FIG. 4 illustrates a block diagram that shows copying and demoting operations in a tiered storage, in accordance with certain embodiments.

FIG. 4 illustrates a block diagram 400 that shows copying and demoting operations in a tiered storage, in accordance with certain embodiments. The operations shown in FIG. 4 may be performed under the control of the storage management application 114 that executes in the storage controller 102.

Data corresponding to a write operation 402 may be first written to extents of a higher storage tier 404, and then the data in the extents may be demoted from the higher storage tier to a lower storage tier 408 (as shown via reference numeral 406). Since the release and allocation of extents that are needed for thin provisioned volumes may be time consuming, the data corresponding to the write operations 402 (where the write operations are frequent) is first written to extents of a higher storage tier 404. The higher storage tier 404 is comprised of storage devices that are faster than storage devices of the lower storage tier 408 and so the frequent write operation are written initially on the higher storage tier 404.

However, since the higher storage tier 404 has lesser storage capacity than the lower storage tier 408, at an opportune time the data from the higher storage tier 404 is moved (opportunistic demote) to the lower storage tier 408. For the purposes of this disclosure, if there are only two storage tiers the higher storage tier 404 may be referred to as the highest storage tier 404.

Figure 5:
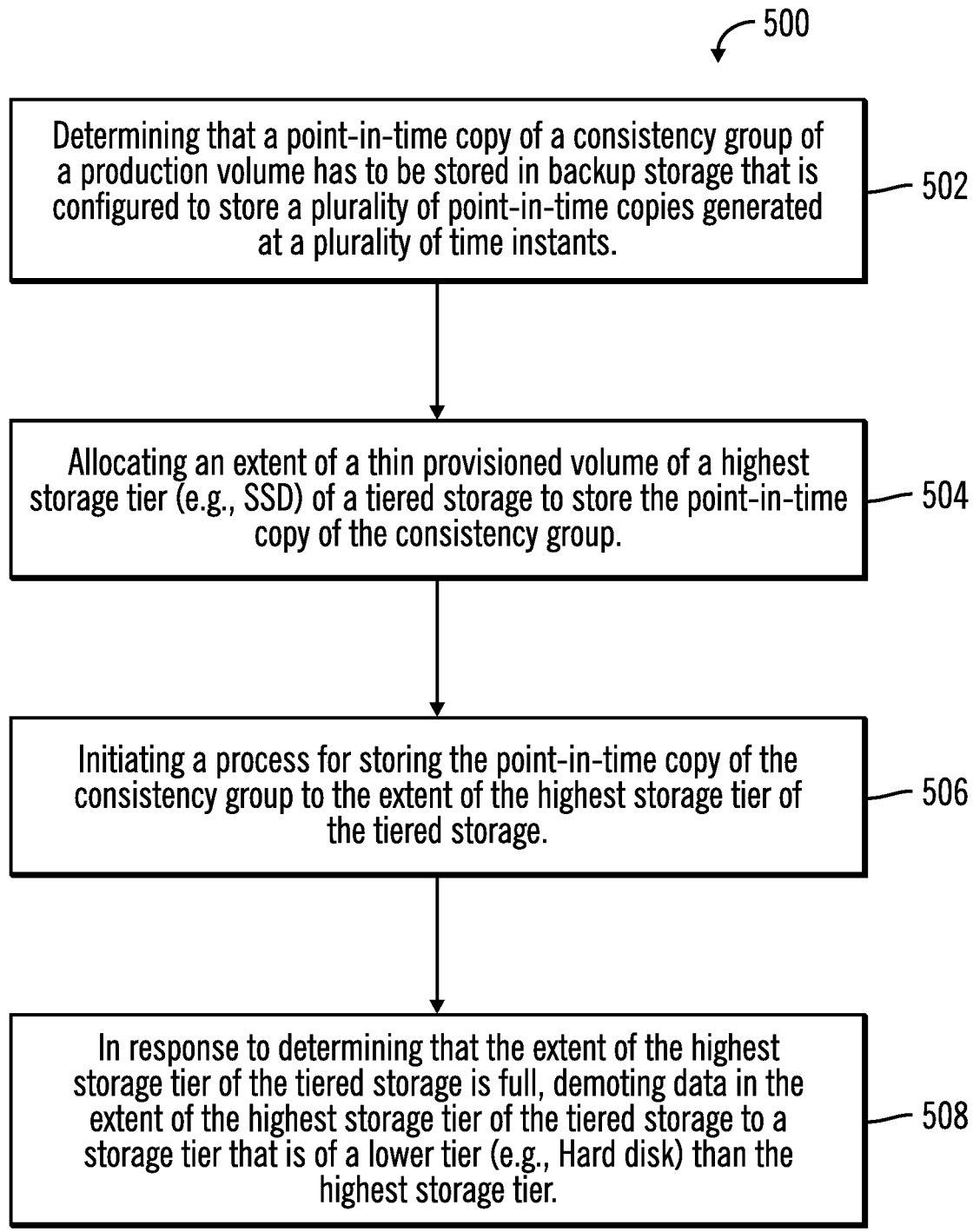
FIG. 5 illustrates a flowchart that shows the management of backup volume extents via a tiered storage mechanism, in accordance with certain embodiments.

FIG. 5 illustrates a flowchart 500 that shows the management of backup volume extents via a tiered storage mechanism, in accordance with certain embodiments. The operations shown in FIG. 5 may be performed under the control of the storage management application 114 that executes in the storage controller 102.

Control starts at block 502 in which the storage management application 114 determines that a point-in-time copy of a consistency group of a production volume 118 has to be stored in a backup storage 120 that is configured to store a plurality of point-in-time copies 121, 122 generated at a plurality of time instants. An extent of a thin provisioned volume of a highest storage tier 106 of a tiered storage 110 is allocated (at block 504) to store the point-in-time copy of the consistency group. A process is initiated for storing (at block 506) the point-in-time copy of the consistency group to the extent of the highest storage tier 106 of the tiered storage 110.

From block 506 control proceeds to block 508, in which in response to the storage management application 114 determining that the extent of the highest storage tier 106 of the tiered storage 110 is full, data in the extent of the highest storage tier 106 of the tiered storage is demoted to a storage tier that is of a lower tier 108 than the highest storage tier 106.

Therefore, FIGS. 1-5 illustrate certain embodiments in which a tiered storage is used to increase the processing speed at which safeguarded copy operations may be performed from production volumes 118 to backup volumes 120.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 6:
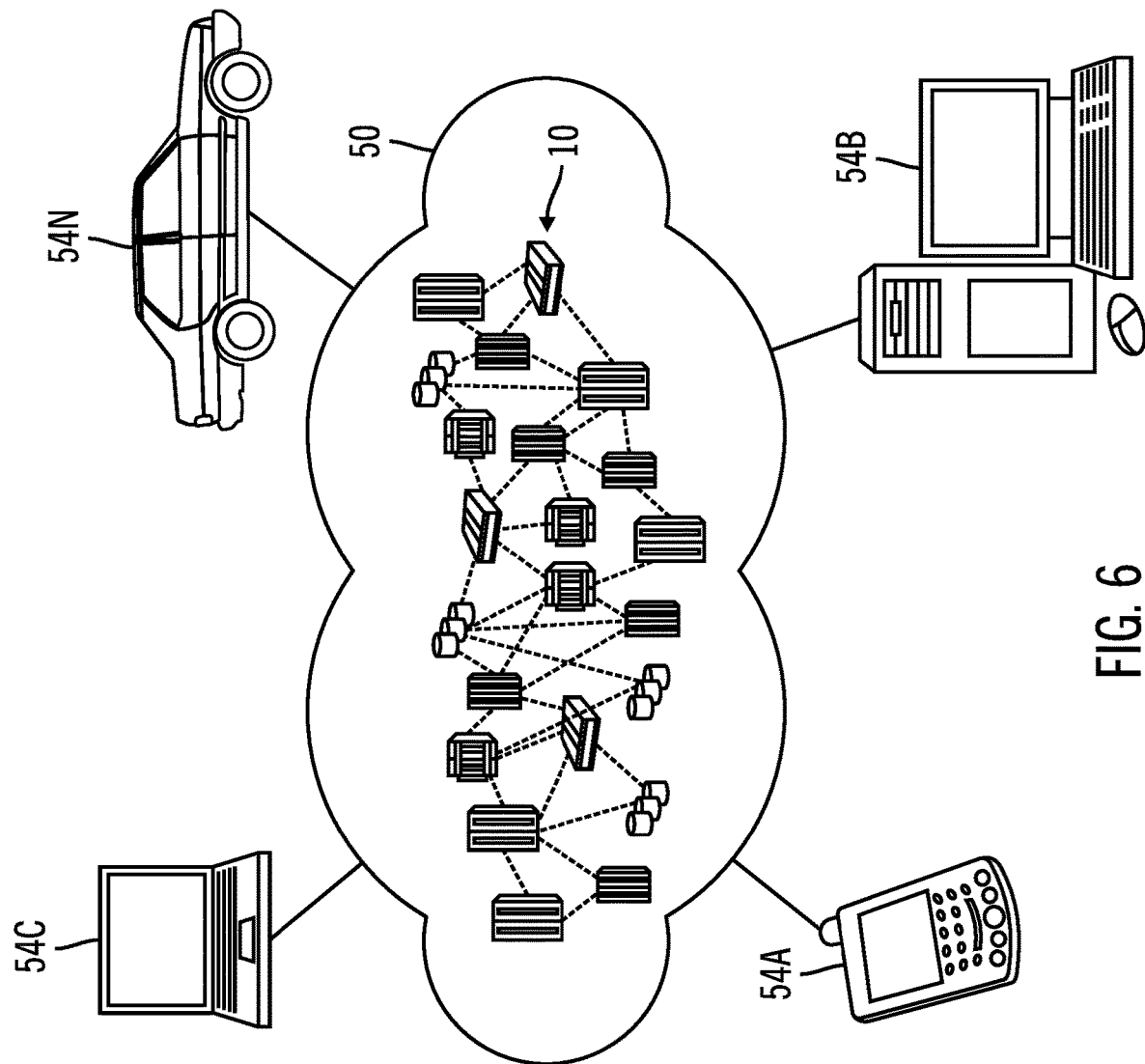
FIG. 6 illustrates a block diagram of a cloud computing environment, in accordance with certain embodiments.

Referring now to FIG. 6 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
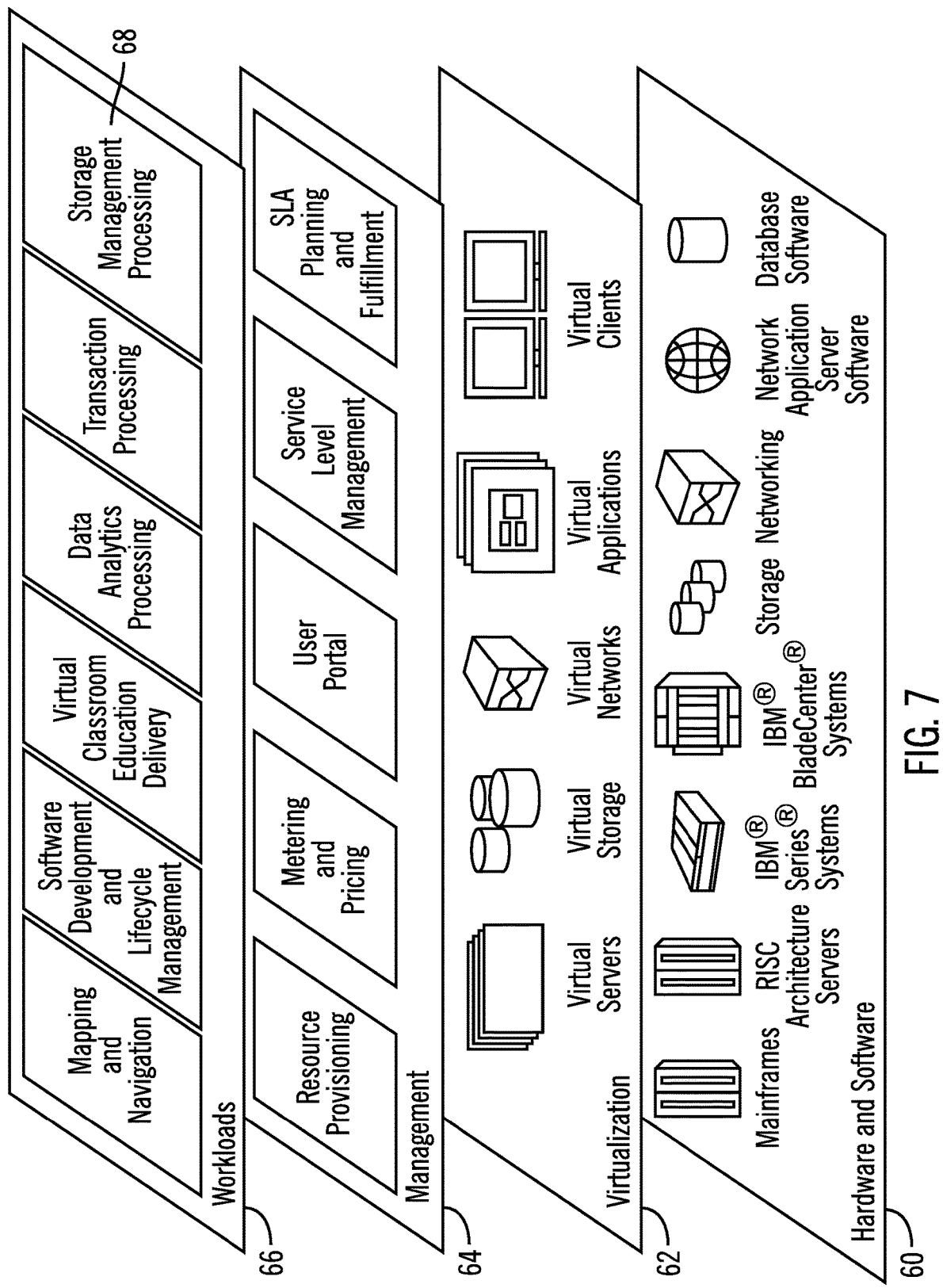
FIG. 7 illustrates a block diagram that shows further details of the cloud computing environment of FIG. 6 in accordance with certain embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and storage management processing 68 as shown in FIGS. 1-6.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 8:
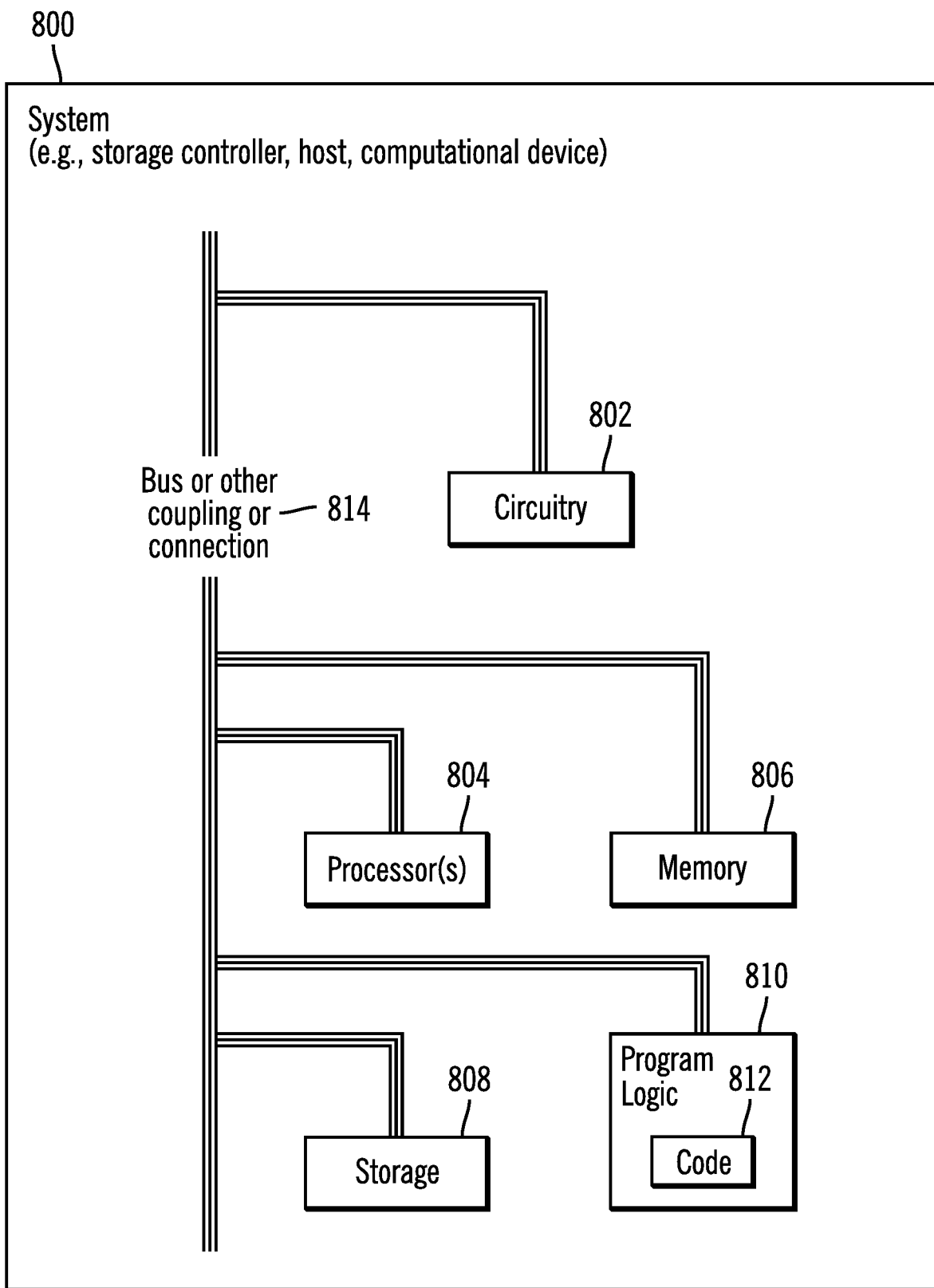
FIG. 8 illustrates a block diagram of a computational system that shows certain elements that may be included in the storage controller or the host, as described in FIGS. 1-7, in accordance with certain embodiments.

FIG. 8 illustrates a block diagram that shows certain elements that may be included in the storage controller 102 or the host 104, or other computational devices in accordance with certain embodiments. The system 800 may include a circuitry 802 that may in certain embodiments include at least a processor 804. The system 800 may also include a memory 806 (e.g., a volatile memory device), and storage 808. The storage 808 may include a non-volatile memory device (e.g., EEPROM, ROM, PROM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. One or more of the components in the system 800 may communicate via a bus or via other coupling or connection 814. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article may be used in place of a single device/article. Similarly, where more than one device or article is described herein, it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   determining, by a storage controller that maintains a backup storage comprising a plurality of thin provisioned volumes that store a plurality of point-in-time copies of consistency groups generated at a plurality of time instants for storing in a tiered storage, that a point-in-time copy of a consistency group of a production volume has to be stored in the backup storage;
   in response to determining that the point-in-time copy of the consistency group of the production volume has to be stored in the backup storage, releasing one or more extents from the backup storage from an oldest point-in-time copy of the plurality of point-in-time copies stored in the backup storage, and subsequently allocating an extent of a thin provisioned volume of a highest storage tier of the tiered storage to store the point-in-time copy of the consistency group; and
   initiating a process for storing the point-in-time copy of the consistency group to the extent of the highest storage tier of the tiered storage, wherein writes of point-in-time copies of consistency groups are initially performed to the highest storage tier of the tiered storage and then written data is demoted opportunistically from the highest storage tier to a storage tier that is of a lower tier than the highest storage tier, wherein reads for data recovery are performed from the lower tier, wherein the highest storage tier is comprised of storage devices that are faster than storage devices of the lower tier, and wherein storage devices of the highest storage tier have lower storage capacity than storage devices of the lower tier, wherein reads from the backup storage for data recovery are less frequent in comparison to writes of point-in-time copies of consistency groups to the backup storage, and wherein release and allocation of extents prior to a writing on thin provisioned volumes makes the writing on thin provisioned volumes more time consuming in comparison to a writing on volumes that are not thin provisioned, and by allocating the extent of the thin provisioned volume from the highest storage tier that is comprised of the storage devices that are faster than the storage devices of the lower tier to store the point-in-time copy of the consistency group, a processing speed of the storage controller is increased over not writing to the highest storage tier.

2. The method of claim 1, the method further comprising:
   in response to determining that the extent of the highest storage tier of the tiered storage is full, demoting data in the extent of the highest storage tier of the tiered storage to a storage tier that is of a lower tier than the highest storage tier.

3. The method of claim 1, wherein reads from the backup storage for data recovery are less frequent in comparison to writes of point-in-time copies of consistency groups to the backup storage.

4. The method of claim 1, wherein a plurality of point-in-time copies are maintained in a circular buffer, and wherein in response to deletion of an older point-in-time copy, extents are released and then new extents are allocated for writing.

5. The method of claim 4, wherein one or more point-in-time copies are deleted based on retention policies indicated for the one or more point-in-time copies.

6. A system comprising a storage controller that maintains a backup storage comprising a plurality of thin provisioned volumes that store a plurality of point-in-time copies of consistency groups generated at a plurality of time instants for storing in a tiered storage, the system comprising:
   a memory; and
   a processor coupled to the memory, wherein the processor performs operations, the operations comprising:
   determining that a point-in-time copy of a consistency group of a production volume has to be stored in the backup storage;
   in response to determining that the point-in-time copy of the consistency group of the production volume has to be stored in the backup storage, releasing one or more extents from the backup storage from an oldest point-in-time copy of the plurality of point-in-time copies stored in the backup storage, and subsequently allocating an extent of a thin provisioned volume of a highest storage tier of the tiered storage to store the point-in-time copy of the consistency group; and
   initiating a process for storing the point-in-time copy of the consistency group to the extent of the highest storage tier of the tiered storage, wherein writes of point-in-time copies of consistency groups are initially performed to the highest storage tier of the tiered storage and then written data is demoted opportunistically from the highest storage tier to a storage tier that is of a lower tier than the highest storage tier, wherein reads for data recovery are performed from the lower tier, wherein the highest storage tier is comprised of storage devices that are faster than storage devices of the lower tier, and wherein storage devices of the highest storage tier have lower storage capacity than storage devices of the lower tier, wherein reads from the backup storage for data recovery are less frequent in comparison to writes of point-in-time copies of consistency groups to the backup storage, and wherein release and allocation of extents prior to a writing on thin provisioned volumes makes the writing on thin provisioned volumes more time consuming in comparison to a writing on volumes that are not thin provisioned, and by allocating the extent of the thin provisioned volume from the highest storage tier that is comprised of the storage devices that are faster than the storage devices of the lower tier to store the point-in-time copy of the consistency group, a processing speed of the storage controller is increased over not writing to the highest storage tier.

7. The system of claim 6, the operations further comprising:
in response to determining that the extent of the highest storage tier of the tiered storage is full, demoting data in the extent of the highest storage tier of the tiered storage to a storage tier that is of a lower tier than the highest storage tier.

8. The system of claim 6, wherein reads from the backup storage for data recovery are less frequent in comparison to writes of point-in-time copies of consistency groups to the backup storage.

9. The system of claim 6, wherein a plurality of point-in-time copies are maintained in a circular buffer, and wherein in response to deletion of an older point-in-time copy, extents are released and then new extents are allocated for writing.

10. The system of claim 9, wherein one or more point-in-time copies are deleted based on retention policies indicated for the one or more point-in-time copies.

11. The system of claim 6, wherein the backup storage is a thin provisioned volume that is not host accessible while copying data from the production volume to a backup volume in a storage controller, wherein undo logs allow construction of backup copies of the production volume, wherein an access pattern of the backup volume is different from the access pattern of a volume that is host accessible.

12. The system of claim 11, wherein backup volumes are maintained as thin provisioned volumes in which extents are allocated only when writing is needed, and wherein the thin provisioned volumes in the backup storage are logical volumes and corresponding physical storage is on physical volumes maintained in the tiered storage.

13. A computer program product, the computer program product comprising:
a computer readable storage medium having computer readable program code embodied therewith, the computer readable program code configured to perform operations on a processor, the operations comprising:
determining, by a storage controller that maintains a backup storage comprising a plurality of thin provisioned volumes that store a plurality of point-in-time copies of consistency groups generated at a plurality of time instants for storing in a tiered storage, that a point-in-time copy of a consistency group of a production volume has to be stored in the backup storage;
in response to determining that the point-in-time copy of the consistency group of the production volume has to be stored in the backup storage, releasing one or more extents from the backup storage from an oldest point-in-time copy of the plurality of point-in-time copies stored in the backup storage, and subsequently allocating an extent of a thin provisioned volume of a highest storage tier of the tiered storage to store the point-in-time copy of the consistency group; and
initiating a process for storing the point-in-time copy of the consistency group to the extent of the highest storage tier of the tiered storage, wherein writes of point-in-time copies of consistency groups are initially performed to the highest storage tier of the tiered storage and then written data is demoted opportunistically from the highest storage tier to a storage tier that is of a lower tier than the highest storage tier, wherein reads for data recovery are performed from the lower tier, wherein the highest storage tier is comprised of storage devices that are faster than storage devices of the lower tier, and wherein storage devices of the highest storage tier have lower storage capacity than storage devices of the lower tier, wherein reads from the backup storage for data recovery are less frequent in comparison to writes of point-in-time copies of consistency groups to the backup storage, and wherein release and allocation of extents prior to a writing on thin provisioned volumes makes the writing on thin provisioned volumes more time consuming in comparison to a writing on volumes that are not thin provisioned, and by allocating the extent of the thin provisioned volume from the highest storage tier that is comprised of the storage devices that are faster than the storage devices of the lower tier to store the point-in-time copy of the consistency group, a processing speed of the storage controller is increased over not writing to the highest storage tier.

14. The computer program product of claim 13, the operations further comprising:
in response to determining that the extent of the highest storage tier of the tiered storage is full, demoting data in the extent of the highest storage tier of the tiered storage to a storage tier that is of a lower tier than the highest storage tier.

15. The computer program product of claim 13, wherein reads from the backup storage for data recovery are less frequent in comparison to writes of point-in-time copies of consistency groups to the backup storage.

16. The computer program product of claim 13, wherein a plurality of point-in-time copies are maintained in a circular buffer, wherein in response to deletion of an older point-in-time copy, extents are released and then new extents are allocated for writing, and wherein one or more point-in-time copies are deleted based on retention policies indicated for the one or more point-in-time copies.

17. The method of claim 1, wherein the backup storage is a thin provisioned volume that is not host accessible while copying data from the production volume to a backup volume in a storage controller, wherein undo logs allow construction of backup copies of the production volume, wherein an access pattern of the backup volume is different from the access pattern of a volume that is host accessible.

18. The method of claim 17, wherein backup volumes are maintained as thin provisioned volumes in which extents are allocated only when writing is needed, and wherein the thin provisioned volumes in the backup storage are logical volumes and corresponding physical storage is on physical volumes maintained in the tiered storage.

19. The computer program product of claim 13, wherein the backup storage is a thin provisioned volume that is not host accessible while copying data from the production volume to a backup volume in a storage controller, wherein undo logs allow construction of backup copies of the production volume, wherein an access pattern of the backup volume is different from the access pattern of a volume that is host accessible.

20. The computer program product of claim 19, wherein backup volumes are maintained as thin provisioned volumes in which extents are allocated only when writing is needed, and wherein the thin provisioned volumes in the backup storage are logical volumes and corresponding physical storage is on physical volumes maintained in the tiered storage.

* * * * *